United States Patent [19]

Kamai et al.

[11] 4,331,317

[45] May 25, 1982

[54] MAGNETIC TYPE FUEL INJECTION VALVE

[75] Inventors: Kenichiro Kamai, Toyoake; Norio Omori, Kariya; Shinichi Nishioka, Okazaki, all of Japan

[73] Assignee: Nippondenso Co., Ltd., Kariya, Japan

[21] Appl. No.: 154,460

[22] Filed: May 29, 1980

[30] Foreign Application Priority Data

Jun. 5, 1979 [JP] Japan .................................. 54-70183

[51] Int. Cl.[3] .......................... F16K 31/06; B05B 1/30

[52] U.S. Cl. .................................... 251/139; 251/141; 239/585; 403/379

[58] Field of Search ................ 251/141, 139; 239/585; 403/379

[56] References Cited

U.S. PATENT DOCUMENTS

| | | | |
|---|---|---|---|
| 3,172,637 | 3/1965 | Adams et al. | 251/139 X |
| 3,366,288 | 1/1968 | Goldschein | 251/141 X |
| 3,967,597 | 7/1976 | Schlagmüller | 251/139 X |

*Primary Examiner*—Arnold Rosenthal
*Attorney, Agent, or Firm*—Cushman, Darby & Cushman

[57] ABSTRACT

A magnetic type fuel injection valve comprises a stationary core magnetized upon energization of a magnetic coil, and a movable core juxtaposed at one end to the stationary core to be normally urged away therefrom by a spring and formed at the other end with an axial bore for receiving one end of a needle valve normally closing a fuel injection nozzle. The movable core is movable as being attracted toward the stationary core together with the needle valve upon magnetization of the stationary core to thereby open the fuel injection nozzle. Through the wall portion of the movable core surrounding the axial bore is formed a transverse hole extending perpendicularly to the axial bore, and another transverse hole is formed through the one end of the needle valve in a manner to align with the first-mentioned transverse hole. A securing pin is snugly fitted in the transverse holes to securely connect the needle valve to the movable core.

2 Claims, 4 Drawing Figures

MAGNETIC TYPE FUEL INJECTION VALVE

BACKGROUND OF THE INVENTION

This invention relates to a magnetic type fuel injection valve, particularly of the type suitable for use with an internal combustion engine, which is opened as an electromagnet is energized by current pulses controlled by electronic control means, to supply to a suction conduit of the engine a fuel pressurized to a predetermined pressure (in the range between 2 and 5 kg/cm$^2$).

One type of fuel injection valve known in the art widely in use comprises a stationary core magnetized when an electromagnetic coil is energized, a movable core juxtaposed against one end of the stationary core for movement toward the stationary core upon energization of the electromagnetic coil, and a needle valve secured at one end thereof to the movable core for movement in the axial direction with the movable core as a unit.

In the aforesaid type of fuel injection valve, it is known to use a construction wherein one end of the needle valve is threadedly connected to the movable core and the connected portion is secured in place by a bonding agent, to thereby prevent relative rotational movement between the needle valve and the movable core. This construction has the disadvantage that the bonding agent may find its way into a needle valve guide and render the needle valve immovable.

West German Laid-Open Patent Specification (Offenlegungsschrift) No. 2,349,584 discloses a construction in which a needle valve formed at its end with irregularities is inserted in a hole formed in a movable core and then the movable core is compressed radially inwardly to deform the wall of the hole to conform in configuration with the irregularities in the end of the needle valve, thereby forcibly fitting and hence securing the irregular end of the needle valve to the wall of the hole in the movable core. This construction has the disadvantages that when the irregular end of the needle valve is forcedly fitted to the wall of the hole in the movable core, the movable core and the needle valve may not be coaxially arranged, and that repeated actuation of the needle valve may loosen the tight connection between the needle valve and the movable core.

SUMMARY OF THE INVENTION

This invention obviates the aforesaid disadvantages of the prior art. Accordingly, an object of the invention is to provide a magnetic type fuel injection valve wherein the needle valve and the movable core are securedly connected together with a simple construction.

According to the invention, there is provided a magnetic type fuel injection valve comprising a magnetic coil, a stationary core adapted to be magnetized upon energization of the magnetic coil, a movable core having one end opposed to one end of the stationary core and being formed with an axial bore open to the other end of the movable core remote from the stationary core, the movable core being movable toward the one end of the stationary core upon magnetization of the stationary core, a needle valve having one end fitted in the axial bore and movable with the movable core to open and close a fuel injection port, a first hole formed through the wall of the movable core surrounding the axial bore and extending substantially perpendicularly to the axial bore, a second hole formed in the one end of the needle valve to substantially align or register with the first hole, and an elongated member tightly or snugly fitted in the first and the second holes to securely connect the needle valve to the movable core.

DESCRIPTION OF THE PREFERRED EMBODIMENT

A preferred embodiment of the invention will now be described by referring to the accompanying drawings.

Figure 1:
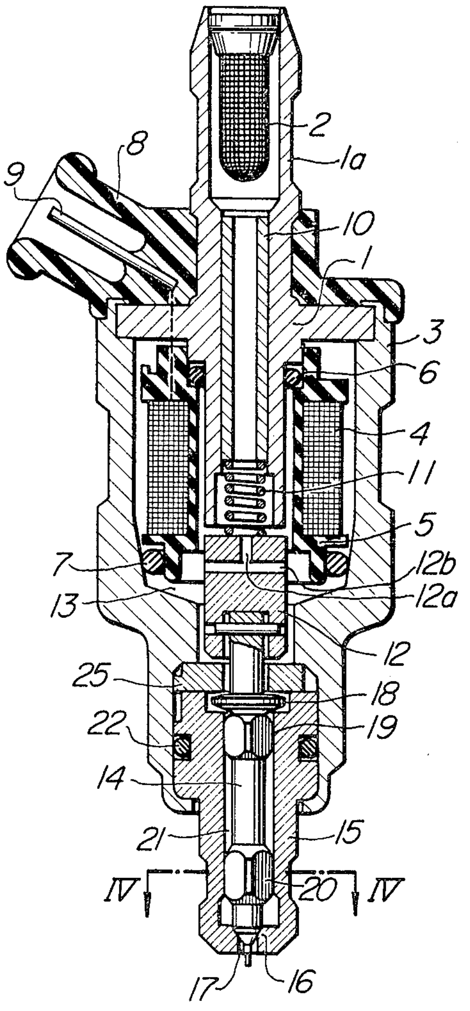
FIG. 1 is a vertical sectional view of a magnetic type fuel injection valve according to an embodiment of the invention.

Referring to FIG. 1, a magnetic type fuel injection valve comprises a tubular stationary core 1 secured in a housing 3, and a movable core 12 opposed to the lower end of the stationary core 1. In the stationary core 1 is fitted an adjusting pipe 10, and a spring 11 is mounted between the lower end of the adjusting pipe 10 and the upper end of the movable core 12 for normally urging the movable core 12 to move downwardly away from the stationary core 1. The biasing force of the spring 11 can be adjusted by inserting the adjusting pipe 10 into an axial bore of the stationary core 1 to a suitable axial position and fixing the same in that position. The stationary core 1 includes an upper end portion 1*a* which is in the form of a connector tube for connecting the fuel injection valve to a fuel supply line, not shown. A filter 2 is press-fitted in the connector tube 1*a* for preventing foreign matter mixed in the fuel supplied thereinto from flowing to the engine.

A magnetic coil 4 is wound on a spool 5 fixed in place in an annular space between the stationary core 1 and the housing 3 and sealed by oil sealing O-rings 6 and 7. The magnetic coil 4 is connected to a terminal 9 which is secured in a connector 8 formed of synthetic resin unitarily with the housing 3, the terminal 9 being adapted to receive electric current pulses from electronic control means, not shown.

The bore of the adjusting pipe 10 fitted in the axial bore of the stationary core 1 serves as a fuel passage, and the O-rings 6 and 7 are effective to prevent inflow of the fuel into a space receiving the magnetic coil 4.

Figure 2:
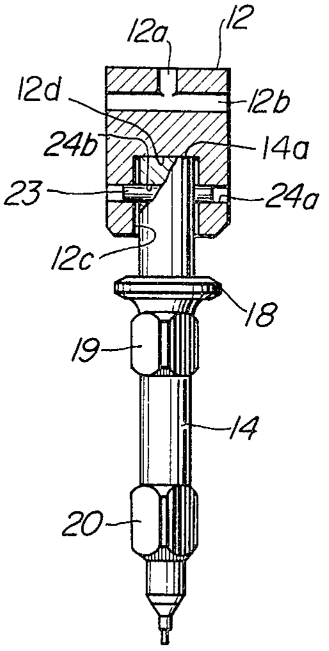
FIG. 2 is a view showing, on an enlarged scale, the connection for securing the needle valve to the movable core in the fuel injection valve shown in FIG. 1.

As shown in FIGS. 1 and 2, passageways 12*a* and 12*b* are formed in the upper portion of the movable core 12 for leading therethrough the fuel to an outer space 13, and the needle valve receiving hole or bore 12*c* is formed in the lower portion of the movable core 12 along the center axis thereof so that the upper end portion of a needle valve 14 can be fitted therein. As clearly illustrated in FIG. 2, surface 14*a* of needle valve 14 directly abuts surface 12*d* of movable core 12, thus providing a secure, non-pivoting, tight connection. A transverse hole 24*a* is formed through the lower wall portion of the movable core 12 which surrounds the receiving bore 12*c*, and extends substantially perpendicularly to an axis of the receiving bore 12*c*. Similarly, through the upper end portion of the needle valve 14 is formed a transverse hole 24*b* substantially aligning with the transverse hole 24a. An elongated member or securing pin 23 is snugly or tightly fitted in the holes 24a and 24b to securely connect the needle valve 14 to the movable core 12.

Figure 3:
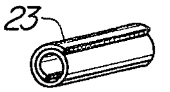
FIG. 3 is a perspective view of the securing pin used in the connection shown in FIG. 2.

As shown in FIG. 3, the securing pin 23 shown and described in this embodiment is in the form of a spring pin obtained by coiling spring steel sheet and having in its free condition an outer diameter slightly larger than the diameter of the transverse holes 24a, 24b. The spring 23 is force fitted in a radially compressed condition into the transverse holes 24a 24b, so that the spring pin 23 in the holes 24a, 24b expands resiliently in a radially outward direction. Thus, the spring pin 23 is brought into intimate contact with the inner wall surface of the transverse holes 24a, 24b, and hence the needle valve 14 is securedly fixed to the movable core 12. Thus when the movable core 12 moves, the needle valve 14 moves with the movable core 12 as a unit in a nozzle body 15 axially thereof. As the needle valve 14 moves unitarily with the movable core 12, the lower end of the needle valve 14 is brought into and out of engagement with a valve seat 16 formed in the nozzle body 15, to thereby close and open a fuel injection nozzle 17 formed in the lower end of the nozzle body 15.

Figure 4:
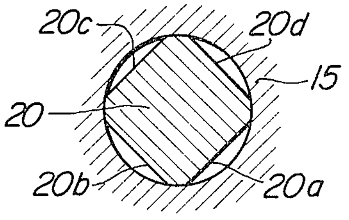
FIG. 4 is a sectional view taken along the line IV—IV in FIG. 1.

The needle valve 14 is formed at its upper portion with a flange 18 serving as a stopper, and with guide portions 19 and 20 disposed below the flange 18 and formed with a fuel passage 21 therebetween. As shown in detail in FIG. 4, the guide portion 20 is chamfered at 20a to 20d to define fuel passages between the guide portion 20 and the nozzle body 15. The guide portion 19 is also similarly chamfered. In FIG. 1 22 is an O-ring, and 25 a spacer.

The illustrated magnetic type fuel injection valve is constructed as described hereinabove. When the fuel injection valve is in the condition shown in FIG. 1, no current pulses are applied to the magnetic coil 4 from the terminal 9. When the valve is in this condition, the fuel under pressure flows from the connector tube 1a into the bore of the adjusting pipe 10, passes around the spring 11, and flows into the outer space 13 through the passages 12a and 12b in the movable core 12 and the space between the movable core 12 and stationary core 1. The fuel introduced into the outer space 13 in turn flows through the guide portion 19, passage 21 and guide portion 20 to the valve seat 16. If a current pulse is applied to the magnetic coil 4 at this time, the stationary core 1 is magnetized and hence the movable core 12 is attracted to the stationary core 1 against the biasing force of the spring 11. This moves the needle valve 14 upwardly in FIG. 1, thereby releasing the lower end of the needle valve 14 from the engagement with the valve seat 16 and allowing the fuel to be ejected through the nozzle 17 in atomized particles. Upon completion of application of the current pulse to the magnetic coil 4, the stationary core 1 is demagnetized, and the movable core 12 is moved downwardly by the biasing force of the spring 11, so that the lower end of the needle valve 14 is brought into engagement with the valve seat 16, thereby completing the ejection of fuel through the nozzle 17.

From the foregoing description, it will be appreciated that the magnetic type fuel injection nozzle according to the invention effects fuel injections by moving the needle valve 14 axially together with the movable core 12 as a unit when current pulses are applied to the magnetic coil 4. According to the invention, the needle valve 14 is securedly connected to the movable core 12 by inserting one end portion of the needle valve 14 in the needle valve receiving hole 12c formed in the movable core 12 along the center axis thereof and by snugly fitting the elongated member or the securing pin 23 in the transverse holes 24a and 24b. By this arrangement, coaxial arranging of the movable core 12 and the needle valve 14 is facilitated when the needle valve 14 is securely connected to the movable core 12, and the disadvantage of the prior art using the bonding agent can be eliminated. The securing pin 23 snugly fitted in the transverse holes 24a, 24b effectively prevents axial movement and rotation of the needle valve 14 and the movable core 12 relative to each other, and no loosening occurs in the connection between the needle valve 14 and movable core 12 even if the needle valve 14 is repeatedly actuated. By constituting the securing pin 23 from a spring pin as in the illustrated embodiment, it is possible to positively secure the needle valve 14 to the movable core 12 by the resilience of the spring pin even if the transverse holes 24a, 24b are not finished with a high precision. This offers the advantage that the transverse holes 24a, 24b can be easily preferably formed after the one end of the needle valve 14 has been inserted into the needle valve receiving hole 12c.

What is claimed is:

1. A magnetic type fuel injection valve comprising:
a magnetic coil;
a stationary core adapted to be magnetized upon energization of said magnetic coil;
a movable core having one end opposed to one end of said stationary core and being formed with an axial bore open to the other end of said movable core remote from said stationary core, said movable core being movable toward said one end of said stationary core upon magnetization of said stationary core, said axial bore having an end face opposite an opening to the other end;
a needle valve having one end fitted in said axial bore and movable with said movable core to open and close a fuel injection port, said needle valve one end having a face directly abutting said axial bore end face;
a first hole formed through the wall of said movable core surrounding said axial bore and extending substantially perpendicularly to said axial bore;
a second hole formed in said one end of said needle valve to substantially align with said first hole; and
an elongated number having, in its free condition, an outer diameter slightly larger than said first and said second holes whereby said member is tightly fitted in said first and second holes to securely connect said needle valve to said movable core.

2. A magnetic type fuel injection valve as set forth in claim 1, wherein said elongated member includes a spring pin formed of spring steel of a curved, coil-like cross section.

* * * * *